Jan. 9, 1962  R. B. STIENS  3,016,038

MAXIMUM-MINIMUM POINTER ASSEMBLY

Filed Aug. 26, 1959

INVENTOR.
ROBERT B. STIENS
BY
*J. Warren Kinney, Jr.*
ATTORNEY

United States Patent Office 3,016,038
Patented Jan. 9, 1962

3,016,038
MAXIMUM-MINIMUM POINTER ASSEMBLY
Robert B. Stiens, Cincinnati, Ohio, assignor to Palmer Thermometers, Inc., Norwood, Ohio, a corporation of Ohio
Filed Aug. 26, 1959, Ser. No. 836,141
5 Claims. (Cl. 116—129)

This invention relates to a maximum-minimum pointer assembly.

An object of the invention is to provide simple yet highly effective means for mounting a maximum-minimum pointer assembly in conjunction with, but independently of, the indicating pointer of a recording or indicating instrument.

Another object of the invention is to provide a maximum-minimum pointer assembly which is adapted to be secured to and carried by the transparent cover plate of an instrument of the type which includes a pivotally mounted indicating pointer; wherein the assembly includes a pair of setting knobs, one for the maximum pointer and one for the minimum pointer, which knobs, when rotated, are adapted to rotate their respective pointers, which pointers, however, are adapted to be independently rotated by the indicating pointer of an instrument, without rotating said knobs.

A further object of the invention is to provide a maximum-minimum pointer assembly which includes a pair of setting knobs, one of which, when rotated, will turn both of the pointers and the other knob, whereas rotation of the other knob will turn but one of the pointers, thereby enabling the two pointers to be quickly and accurately returned to an initial or zero setting in aligned or contacting relationship with the indicator pointer of the instrument.

These and other objects are attained by the means described herein and as disclosed in the accompanying drawings, in which.

Figure 1:
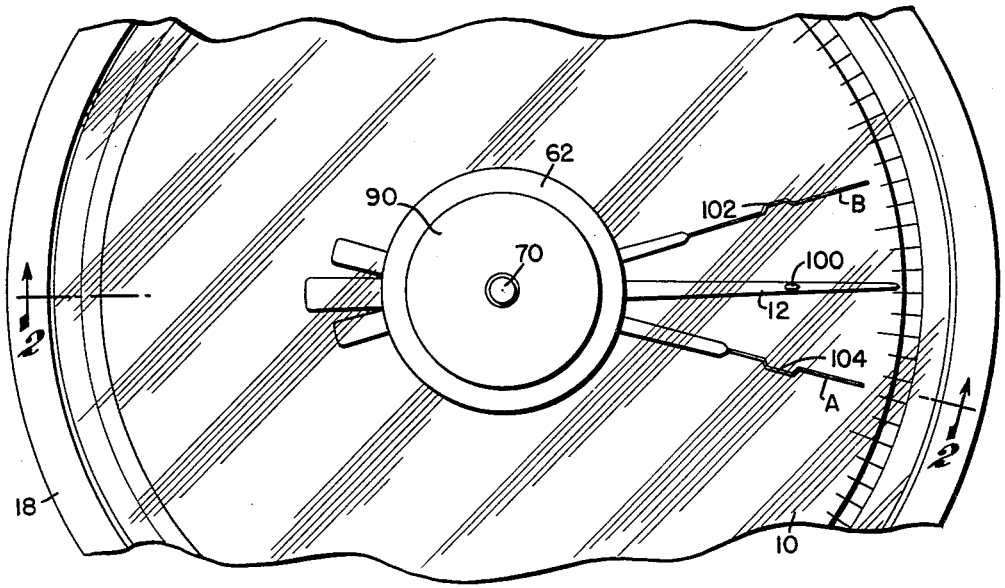
FIG. 1 is a partial top plan view of an indicator dial provided with a maximum-minimum pointer assembly embodying the teachings of the present invention.

With reference to the drawings, the numeral 10 denotes generally a dial face and the numeral 12 an indicating pointer secured to and carried by rotatable shaft 14 which is secured in driven relationship with suitable actuating mechanism contained within chamber 16 of a typical indicating instrument.

It should be understood that the present invention is neither directed to nor concerned with the particular type of indicating instrument, nor with the type of actuating mechanism within chamber 16, such mechanism comprising, solely by way of example, means responsive to changes in pressure, temperature, humidity, electrical potentials and the like.

The numeral 20 denotes, generally, a transparent cover member suitably secured to housing 18 by any suitable means not relevant to the present invention.

Figure 2:
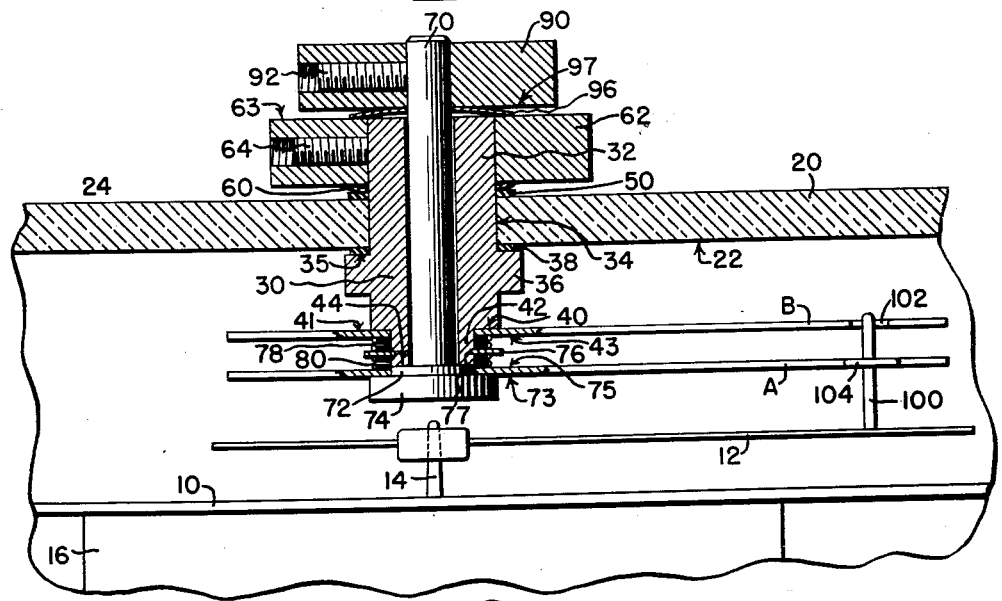
FIG. 2 is an enlarged sectional view taken along line 2-2 of FIG. 1.

With particular reference now to FIG. 2, the numeral 30 denotes a hollow, axially bored first shaft having an upper cylindrical portion 32 which is rotatably journaled in and extends through axial bore 34 through the cover member 20. Upper face 35 of an annular shoulder or abutment 36 formed integral with shaft 30 engages the lower face of a Teflon or nylon bushing 38 whose upper face engages lower face 22 of the cover member. The lower end of shaft 30 is undercut as at 40 for providing a cylindrical portion 42 of reduced diameter terminating in a lower axial face 44.

A second Teflon or nylon bushing 50 engages the upper portion 32 of shaft 30, said bushing being disposed between upper face 24 of the cover member and the lower face of a friction clutch element in the form of a curved tension washer 60. A control knob 62 is secured to and carried by the upper portion 32 of shaft 30 to which it is securely though releasably anchored by means of a set screw 64.

From the foregoing, it will be noted that first shaft 30 has thus been rotatably journaled relative to the transparent cover member 20. The resistance to relative motion between said shaft and the cover member is determined by and a function of the degree of compression to which spring tension washer or friction clutch 60 is subjected.

The numeral 70 denotes a second shaft which is rotatably journaled in and extends axially through the bore of the first shaft, having a lower end which terminates in a stepped flange comprising annular shoulders 72 and 74.

Before shaft 70 is associated with shaft 30, the hub of minimum indicator B is seated upon cylindrical portion 42 with upper face 41 of the hub abutting face 40 of shaft 30. A spring 78 is then disposed between lower hub face 43 and the upper face of a spacer ring 76 which is fixedly secured to and carried by cylindrical portion 42. Uniformly satisfactory results have been obtained in those instances wherein ring 76 comprises a Truarc retainer ring which is snapped into an annular recess 77 in portion 42.

The hub of maximum indicator A is seated upon shoulder 72 with lower face 73 engaging the upper face of shoulder 74. A second annular spring 80 is disposed between upper face 75 of the hub and lower face of spacer ring 76.

The free upper end of second shaft 70 extends beyond the upper end of first shaft 30 whereby to receive an actuator knob 90 which is securely though releasably secured thereto by means of a set screw 92.

The numeral 96 denotes a second friction clutch in the form of an annular dished spring tension washer whose outer periphery abuts against upper face 63 of the lower control knob 62 and whose upper surface engages the lower face 97 of upper control knob 90.

Operation of the assembly illustrated in FIG. 2 is as follows: Indicators A and B are secured relative to their respective shafts 70 and 30 in such a manner as to permit them to be rotated relative to said shafts incident to the application of motion imparted to said indicators by reason of being contacted by post 100 of operating pointer 12.

When it is desired to return the pointers A and B to an initial setting in contacting relationship with post 100 of the operating pointer or indicator 12, the larger knob 62 is rotated until post 100 is seated in offset 102 of pointer B, after which the pointer will slip relative to further rotation of shaft 30. Such rotation of shaft 30 via knob 62 will also turn shaft 70, knob 90 and indicator A away from post 100.

Knob 90 may then be rotated relative to knob 62 and shaft 30, which will remain stationary by reason of the friction applied thereto by friction clutch elements 60 and 96 for moving pointer A until offset 104 engages post 100.

From the foregoing, it will be observed that I have provided simple yet highly effective means for providing a minimum-maximum pointer assembly in conjunction with the cover panel of a recording or indicating instrument of the type having an operating pointer which is rotatable about a fixed axis.

It should be understood that various changes in the structural details of the device may be made, within the scope of the appended claims, without departing from the spirit of the invention.

What is claimed is:

1. A maximum-minimum pointer assembly for association with the transparent cover member of an indicating device, said cover member having a bore therethrough, said assembly comprising an axially bored first shaft rotatably journaled in and extending through the bore of said cover member, said shaft having an upper end and a lower end, the lower end of said shaft terminating in a cylindrical portion of reduced diameter, said portion having an upper and lower end, a first pointer journaled on the upper end of said cylindrical portion, a spacer member secured to and projecting radially from said cylindrical portion intermediate the ends of said portion, first means mounted on said cylindrical portion normally and yieldably urging said first pointer away from said spacer member, a second shaft extending axially through said bore of said first shaft, said second shaft having an upper and lower end, the lower end of said second shaft terminating in an annular shoulder of increased diameter, a second pointer journaled on said shoulder, second means mounted on said cylindrical portion of said first shaft below said spacer member normally and yieldably urging said second pointer therefrom, a first control knob secured to the upper end of said first shaft outwardly of said cover member, first friction means between said first knob and said cover for precluding accidental or unintentional rotation of said first shaft relative to said cover member, a second control knob secured to the upper end of said second shaft beyond said first control knob, second friction means disposed between said first and second control knobs for precluding accidental or unintentional rotation of said first shaft relative to said second shaft, said second friction means placing the second control knob in driven relationship with said first control knob whereby turning of the first control knob will simultaneously rotate both the first and second shafts and the second control knob, and whereby turning of the second control knob will rotate only the second shaft.

2. The assembly of claim 1 wherein said first means consists of a spring, said second means consists of a spring, and said annular shoulder comprises a pair of annular shoulder members including an upper shoulder member and a lower shoulder member projecting radially beyond said upper shoulder member, and said second pointer is journaled on said upper shoulder member and bears against said lower shoulder member.

3. The assembly of claim 2 wherein said second shaft is rotatably journaled in the axial bore of said first shaft, and the upper shoulder member is in contacting relationship with the lower end of said first shaft.

4. The assembly of claim 1 wherein said first means consists of a spring, said second member consists of a spring and said annular shoulder comprises stepped annular shoulder members, including an upper shoulder member and a lower shoulder member projecting radially beyond said upper shoulder member, said second pointer is journaled on said upper shoulder member and bears upon said lower shoulder member, and said second shaft is rotatably journaled in the bore of said first shaft.

5. A maximum-minimum pointer assembly comprising a first hollow shaft, a transparent cover member having a bore therethrough, an axially bored first shaft rotatably journaled in and extending through the bore of said cover member, a second shaft extending axially through and rotatably journaled in said first shaft, a first control knob secured to said first shaft outwardly of said cover member for rotating said first shaft, a second control knob secured to said second shaft above said first knob for rotating it, a first pointer mounted on said first shaft, a second pointer mounted on said second shaft, a spacer ring member secured to said first shaft, first biasing means mounted on said first shaft between said ring member and said first pointer for yieldably holding said first pointer to said first shaft, a second biasing means mounted on said first shaft between said ring member and said second pointer for yieldably holding said second pointer to said second shaft, first friction means disposed between said first knob and said cover member for precluding accidental or unintentional rotation of said first shaft with respect to said cover member, second friction means disposed between said first and second knobs for precluding accidental or unintentional rotation of said first shaft relative to said second shaft, said second friction means placing said second control knob in driven relationship with said first control knob whereby turning of the first control knob will simultaneously rotate both the first and second shafts and the second control knob, and whereby turning of the second control knob will rotate only the second shaft.

References Cited in the file of this patent

UNITED STATES PATENTS 2,848,973     Stiens ----------------- Aug. 26, 1958